(12) United States Patent
Kadie

(10) Patent No.: US 9,783,062 B2
(45) Date of Patent: Oct. 10, 2017

(54) CHARGER NETWORK HAVING A VARYING MASTER

(71) Applicant: Michael Kadie, San Diego, CA (US)

(72) Inventor: Michael Kadie, San Diego, CA (US)

(73) Assignee: Current Ways, Inc., Santee, CA (US)

(*) Notice: Subject to any disclaimer, the term of this patent is extended or adjusted under 35 U.S.C. 154(b) by 0 days.

(21) Appl. No.: 14/714,284

(22) Filed: May 16, 2015

(65) Prior Publication Data

US 2015/0246618 A1 Sep. 3, 2015

Related U.S. Application Data

(63) Continuation-in-part of application No. 13/355,897, filed on Jan. 23, 2012, now abandoned.

(51) Int. Cl.
| | |
|---|---|
| *H02J 7/00* | (2006.01) |
| *B60L 3/12* | (2006.01) |
| *B60L 3/00* | (2006.01) |
| *B60L 11/18* | (2006.01) |
| *H02J 7/02* | (2016.01) |

(52) U.S. Cl.
CPC ............... *B60L 3/12* (2013.01); *B60L 3/0092* (2013.01); *B60L 11/1816* (2013.01); *B60L 11/1846* (2013.01); *B60L 11/1864* (2013.01); *H02J 7/02* (2013.01); *B60L 2200/36* (2013.01); *B60L 2230/12* (2013.01); *H02J 2007/0096* (2013.01); *Y02T 10/7005* (2013.01); *Y02T 10/7061* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC ........................................................ 320/112
See application file for complete search history.

(56) References Cited

U.S. PATENT DOCUMENTS

| | | | | |
|---|---|---|---|---|
| 5,777,457 A * | 7/1998 | Lee | ........ | H02J 7/0077 320/137 |
| 5,900,717 A * | 5/1999 | Lee | ........ | H02J 7/0091 320/150 |
| 6,741,065 B1 * | 5/2004 | Ishii | ........ | B60L 11/1816 320/122 |
| 7,059,769 B1 * | 6/2006 | Potega | ........ | B60L 11/1861 338/22 R |
| 7,471,066 B2 * | 12/2008 | Ambrosio | ........ | H02J 7/0014 320/110 |
| 8,547,065 B2 * | 10/2013 | Trigiani | ........ | H02J 7/0018 320/118 |
| 2014/0028098 A1 * | 1/2014 | Trigiani | ........ | H02J 7/0018 307/39 |

* cited by examiner

*Primary Examiner* — Yalkew Fantu
(74) *Attorney, Agent, or Firm* — Themis Law

(57) ABSTRACT

A flexible charger network includes one or more chargers, each coupled to a processor, and is configured to perform the following operations: at power-up, a charger announces its presence to the network, and requests and awaits an acknowledgement by the network; and, if no acknowledgement is received from the network, that charger assumes a role of master of the network; or, if a response is received from the network, that charger acknowledges an existing master and assumes the role of slave within the network.

20 Claims, 2 Drawing Sheets

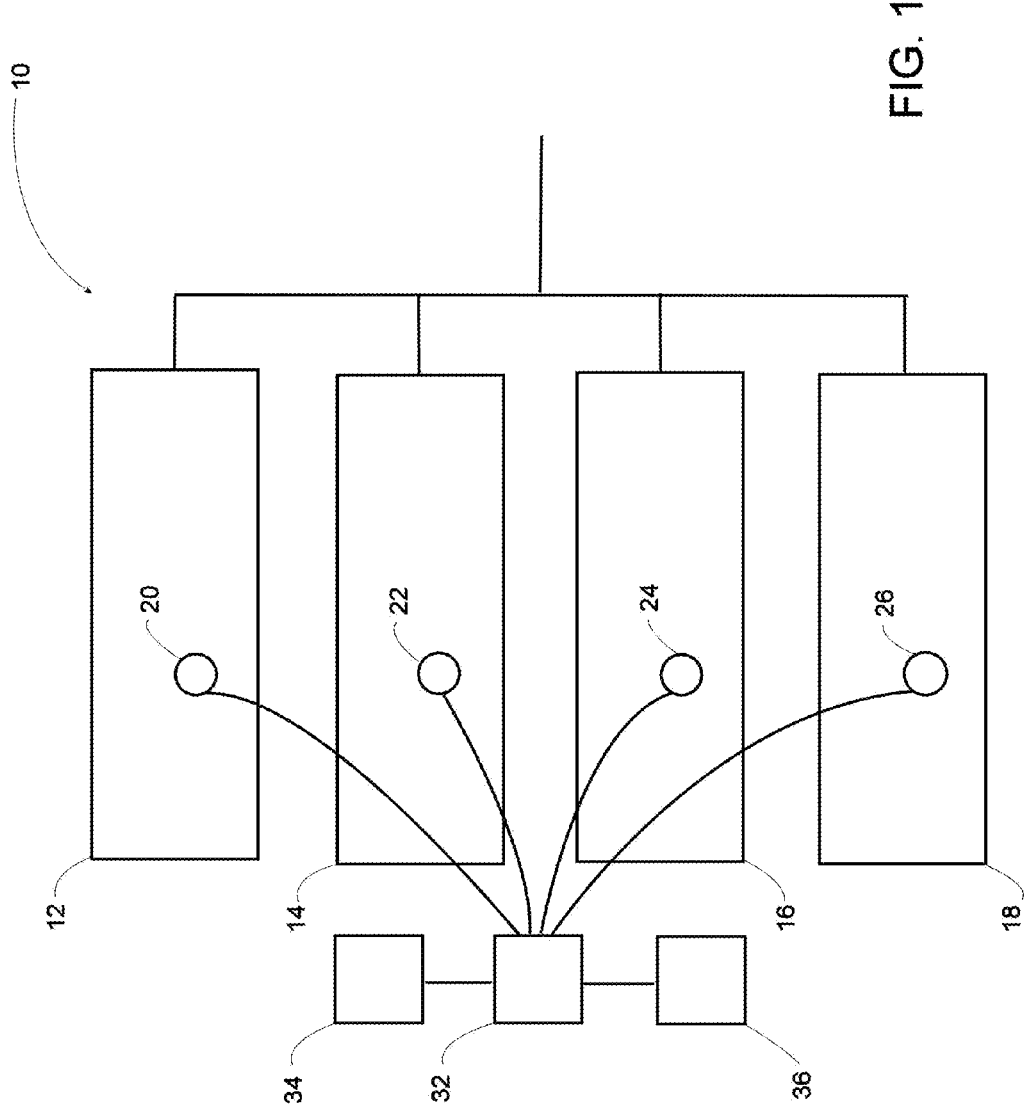

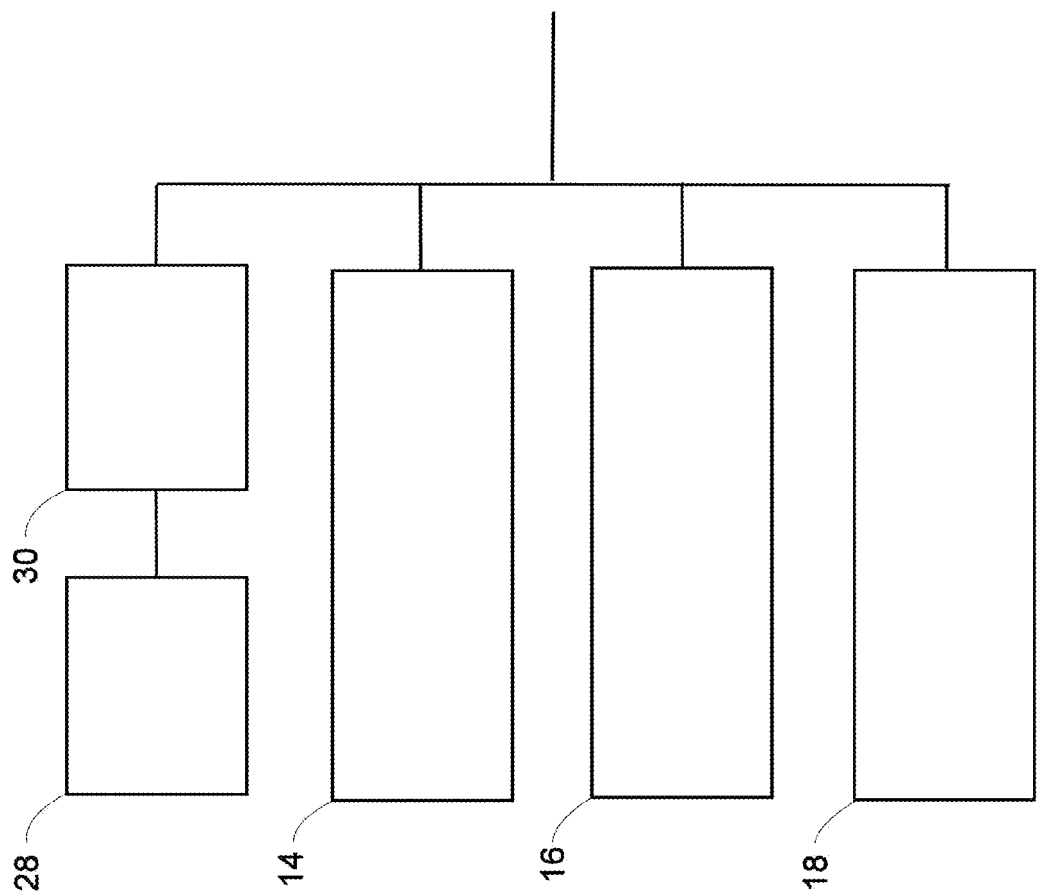

CHARGER NETWORK HAVING A VARYING MASTER

FIELD OF THE INVENTION

The present invention relates to a charger network, in which different chargers within the network may assume the role of master at different times. In one application, a charger network according to the invention is used to charge the batteries of an electric vehicle.

BACKGROUND OF THE INVENTION

A battery charger is a power supply with controllable voltage, current and power limits.

Chargers can be operatively connected in a network, within which one charger is assigned the role of master and the other chargers are assigned the roles of slaves.

In charger networks in the prior art, the roles of master and slave are fixed. Moreover, charger networks in the prior art are configured to have the master provide the required amount of power to the load by subdividing power demand equally among all the chargers in the network. Examples of charger networks in the prior art are described in U.S. Pat. No. 7,059,769 to Potega and in U.S. Pat. No. 7,471,066 to Ambrosio et al.

Charger networks in the prior art are rigid, because the role of master is limited to a single pre-assigned master and slaves cannot be added or subtracted during a charging cycle. Moreover, charger networks in the prior art cannot be configured to operate with different numbers of chargers at different times to meet specific operational objectives, such as maximizing efficiency of charge at one time or speed of charge at another time.

SUMMARY OF THE INVENTION

The present invention overcomes the drawbacks of charger networks in the prior art by providing a flexible charger network, in which the role of master can be assumed by any of the chargers in the network, and by which the required amount of power can be provided using different numbers of chargers by switching some of the chargers to an enabled state or a disabled state.

More particularly, a flexible charger network according to the invention includes one or more chargers, each having a processor that is operatively coupled to the charger. The network is configured to perform the following operations: at power-up, a charger first announces its presence to the network, identifies itself by providing its serial number, and requests and awaits an acknowledgement by the network. If no acknowledgement is received from the network, that charger assumes the role of master of the network, or, if a response is received from the network, that charger acknowledges the existing master and assumes the role of slave within the network.

The network may include more than one charger. If two chargers power up at the same time and there is no existing master, the network arbitrates the role of master. In one embodiment, the charger having the higher serial number assumes the role of master of the network because it is considered to have a higher probability of including the most updated code. In another embodiment, each charger is provided with a rule of arbitration.

The chargers in the network may communicate with one another via a controller area network (CAN bus), which has at least two channels. One of those channels is for communications within the network, and the other one is for communications with other networks or systems, such as the battery management system (BMS) of a vehicle. The two channels of the CAN bus may identify each message transiting through the CAN bus as belonging to one or the other channel by way of a target ID of the message.

In one embodiment, the master may use the serial number of each charger to assign a virtual charger number to each charger within network 10. This assignment is performed at session level and, among other things, reduces the size of the messages issued by chargers in network 10. Moreover, this assignment virtualizes the network to an outside observer, such that the network may appear of consisting of a single charger (the master) rather than a plurality of chargers.

Moreover, all chargers may be designed to be forward and backward compatible, thereby enabling complete flexibility in building or modifying the network.

In different modes of use, the charger network may cause the master to provide power to the load by using any desired numbers of chargers, increasing efficiency if using a lower number of chargers while disabling some of the chargers, or increasing speed of charge if using a higher number of chargers.

Each charger within the network has an overhead, that is, it requires some power to operate regardless of whether it is operational or not. That overhead may be subdivided in an enabled state overhead and a disabled state overhead. A disabled charger would then operate using only the disabled state overhead in order to reduce power consumption and increase efficiency.

A charger network according to the invention may also include a status indicator, which provides a status of the network (for example, to the battery management system of a vehicle being charged) by issuing one or more messages.

If the master ceases operation, the network also ceases operation. As long as the master is not communication with the network, the network will be down. In that case, the network will periodically try to come back up and restart operation, but will not assign a new master without a power cycle, because it cannot be ascertained whether the loss of a master is due to a fault causing a shutdown of the master, or a fault causing a communication failure. However, in the event of a failing slave, the network will shut itself down and restart immediately, recovering to a smaller network state.

In the event of problems that are not related to the multiplicity of the network, the network will reduce power or shut down as appropriate and also activate a timer to retry powering up in case those problems are transient. The most common transient problem is over-temperature and low AC voltage. In the field, these types of problems are often caused by transient events that may go away if given sufficient time, for example, heavy machinery that causes an AC voltage drop. An arrangement according to the invention provides for maximum charging while minimizing risk and adhering to constraints such as maximum AC current draw.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

FIG. 1 depicts a flexible charger network according to the invention.

FIG. 2 depicts the flexible charger network of claim 1, wherein one charger has been replaced by two chargers disposed in series.

DETAILED DESCRIPTION OF EMBODIMENTS OF THE INVENTION

Detailed descriptions of embodiments of the invention are provided herein. It is to be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

FIG. 1 illustrates a flexible charger network 10 according to the invention. In one application, network 10 can be used to charge an electrically powered vehicle such as a car or a truck.

The illustrated embodiment includes four chargers 12, 14, 16 and 18, each of which is operatively coupled to a processor 20, 22, 24 and 24. However, a network according to the invention can include any number of chargers, from one (in which case the network includes a single charger) to any number as practically possible.

Each of chargers 12, 14, 16 and 18 is disposed in parallel and each provides the same voltage. If any charger has a voltage different from the other chargers, the network would generate an error message and operation of network 19 would be terminated.

While each of chargers 12, 14, 16 and 18 has been depicted as a single charger, it could be replaced by a plurality of chargers disposed in series that collectively provide the same voltage as any of chargers 12, 14, 16 or 18, within the constraints of voltage and current that may be present. For example, as shown in FIG. 2, charger 12 may be replaced by two chargers 28 and 30 disposed in series that together provide the same voltage as charger 12.

Referring again to FIG. 1, processors 20, 22, 24 and 26 communicate with one another through a shared bus, such as a controller area network (CAN bus) 32, which may have a plurality of channels. For example, CAN bus 32 may have two channels, one of which may be used for communications among processors 20, 22, 24 and 26, and the other one for communications by the BMS or other vehicle system. In particular, CAN Bus 32 communicates the demands of the vehicles' battery management system (BMS) 36 to charging network 10.

Therefore, the communication system of flexible charger network 10 can coexist with the communication system of the BMS of the vehicle being charged. CAN bus 32 may distinguish between the communications by network 10 and the BMS by having two communication channels and by detecting a target ID associated with messages sent by network 10, or with messages sent by the BMS. This design reduces the use of available resources.

Flexible charger network 10 is configured to operate in the following manner. In the following description, reference will be made to charger 12, although the following description applies equally to any of the chargers within network 10.

Upon power-up, charger 10 announces its presence and provides its serial number to the network. For example, charger 10 may send a first message announcing its presence, and a second message providing its serial number.

Then, charger 12 asks for acknowledgement by other chargers within network 10, and listens for any acknowledgements that it may receive from the other chargers in network 10 through CAN bus 32.

As explained earlier, network 10 may be configured to operate with any number of chargers, from one to a number as large as practically possible. Additional chargers may be added to chargers 12, 14, 16 and 18 of network 10 during a charging cycle, or may be subtracted therefrom. For example, a mix of internal chargers (12, 14, 16, 18) and external chargers may be implemented to meet specific charging requirements, such as a fast charging requirement at a charging station or a depot.

If no acknowledgements are received from network 10, charger 12 assumes the role of network master as the only charger present in the network, or at least as the only operating charger. After assuming the role of master, charger 12 issues an abbreviation of its serial number as the charger ID over the assigned slot within CAN bus 32. Having charger 12 provide its serial number for a second time, even if in abbreviated form, is helpful in detecting simultaneity of start-up.

In the presently described embodiment, charger 12 issues its charger number instead of its serial number after assuming the role of master and maps the network. This not only decreases message size (e.g. from 4 bites to 1 bite), but also virtualizes the charger network to CAN bus 32, such that the outer environment can perceive network 10 as one charger (number 0) regardless of the number of chargers that are connected to network 10 or of which charger has assumed the role of master.

Instead, if charger 12 receives an acknowledgement from another charger in network 10, charger 12 acknowledges the other charger as the master and assumes the role of slave.

In the event that two or more chargers power up at the same time, and there is no pre-existing master, then the charger with the highest serial number is recognized as the new master. This is done under the assumption that the charger with the highest serial number has a highest probability of having the most updated code.

A person of skill in the art will appreciate that a network according to the invention has no fixed number of chargers and no fixed master, as chargers can be added or removed as desired and the role of master may be assumed by different chargers upon power-up. For example, some chargers may need to be removed from the network due to a faulty fuse or by becoming unplugged.

Moreover, a flexible charger network according to the invention may be configured to be compatible between all versions or revisions of hardware and software within applicable physical constraints, such as output voltage. For example, chargers having different output voltages cannot be connected to the network because they are not output-hardware compatible. The connection of two chargers of incompatible physical constraints will cause a network to report an error without ever engaging the chargers of that network. At the same time, in a network according to the invention, a alpha 3 kW charger can be connected to a 3rd generation 6.6 kW charger as long as they have compatible outputs, and such connection will be transparent to the outside world.

A network according to the invention enables also an optimization of the charging process by increasing either efficiency of charge or speed of charge as desired.

For example, the master may power up the network to meet or exceed the requested level of power from an electric vehicle with the fewest possible number of chargers. This will increase efficiency of the network, because each charger operates most efficiently at or near maximum charge load. The master may also power up a network to meet or exceed the requested level of power from an electric vehicle with the highest number of chargers. This will increase speed of charge if the number of available chargers exceeds the requested power level. In the event that the requested power level is greater than the presently available output of all the chargers, the master will attempt to power up all the chargers.

Each charger carries an overhead, which is a predetermined amount of power that is required to operate the charger and that is not usable to charge the electric vehicle. In one embodiment, the overhead may be 40 W. In one embodiment, the overhead of each charger is divided into a disabled state overhead, which is the amount of power required by the charger when it is not operational (in sleep mode), and an enabled state overhead, which is the additional amount of power required by the charged when it is operational, and which is typically larger than the disabled state overhead. Therefore, a network according to the invention runs using a lower amount of overhead when one or more chargers are in the disabled state, than when all charges are in the enabled state.

In another embodiment, if the master stops operating, for example, becomes unplugged, the network shuts down immediately. The shut-down protects the network, because the network is not in a position to determine why the master has stopped operating, for example, whether that was due to a load problem or to a communication problem. Likewise, the network may reduce output, for example, after a fault is detected or a warning is issued.

As long as the master is not communication with the network, the network is down. After shut-down, the network then remains in sleep mode for a predetermined amount of time, for example, 30 minutes. That predetermined amount of time is selected to minimize casual risk while maximizing total charge.

Thereafter, a timer causes the network to attempt resetting or resuming operation by having the master perform a check-up to verify which chargers are operational. After the check-up has been completed, the network may resume operation either in full mode or in a reduced mode as appropriate depending on the severity of the condition of the master. Otherwise, the network may return to sleep mode if the master is still disabled.

A status indicator 34 may also be provided, which send messages to BMS 36 or other system components through CAN bus 32 providing a status of charger network 10.

While the invention has been described in connection with the above described embodiments, it is not intended to limit the scope of the invention to the particular forms set forth, but on the contrary, it is intended to cover such alternatives, modifications, and equivalents as may be included within the scope of the invention. Further, the scope of the present invention fully encompasses other embodiments that may become obvious to those skilled in the art and the scope of the present invention is limited only by the appended claims.

The invention claimed is:

1. A flexible charger network comprising:
   one or more chargers, each having a processor operatively coupled thereto, the one or more chargers forming a network,
   wherein the network is configured to perform the following operations:
   at power-up, a charger announces its presence to the network, identifies itself, and requests and awaits an acknowledgement by the network; and,
   if no acknowledgement is received from the network, the charger assumes a role of master of the network; or
   if a response is received from the network, the charger acknowledges an existing master and assumes a role of slave within the network.

2. The flexible charger network according to claim 1, wherein the charger identifies itself by providing its serial number.

3. The flexible charger network according to claim 2, wherein the network comprises a plurality of chargers, and wherein, if more than one charger powers up at a same time and there is no existing master, the network arbitrates an assignment of the role of master of the network.

4. The flexible charger network according to claim 3, wherein the network arbitrates the assignment of the role of master by causing a charger having a higher serial number to assume the role of master of the network.

5. The flexible charger network according to claim 2, wherein, if the charger assumes the role of master of the network, the charger provides its serial number in abbreviated form to the network after assuming the role of master, thereby providing a detection of simultaneous start-up.

6. The flexible charger network according to claim 1, wherein, if the charger assumes the role of master of the network, the charger provides a charger number to each charger in the network after assuming the role of master, thereby reducing message size and virtualizing the network to an outer environment.

7. The flexible charger network according to claim 1, wherein the one or more chargers communicate with one another via a controller area network (CAN bus), and wherein the CAN bus has at least two channels, of which one is for communications within the network of the one or more chargers, and wherein another one is for communications within another network or system.

8. The flexible charger network according to claim 7, wherein the at least two channels identify each message transiting therethrough as belonging to one of the at least two channels by a target ID of the message.

9. The flexible charger network according to claim 1, wherein the network comprises a plurality of chargers, and wherein the network is configured to have the master power up the network using any desired number of chargers, thereby increasing efficiency by using a lower number of chargers and disabling some of the chargers, or increasing speed of charge by using a higher number of chargers.

10. The flexible charger network according to claim 9, wherein each charger includes an enabled state and disabled state overhead, and wherein a disabled charger operates only with the disabled state overhead in order to decrease power consumption and increase efficiency.

11. The flexible charger network according to claim 1, further comprising a status indicator providing a status of the network by providing one or more messages on a status of the network.

12. The flexible charger network according to claim 1, wherein, if the master is not operating, the network terminates operation.

13. The flexible charger network according to claim 12, wherein the network is configured to attempt to reset or restart operating without assigning a new master after a fault is detected or a warning is issued that causes a reduction or a termination of output, and wherein an attempt to reset or restart operating is performed after a predetermined amount of time, such to maximize total charge while minimizing casual risk.

14. A method of operating a charger network comprising:
providing one or more chargers, each having a processor operatively coupled thereto, the one or more chargers forming a network;
at power-up, causing a charger to announce its presence to the network, to identify itself by providing its serial number, and to request and await an acknowledgement by the network; and,
if no acknowledgement is received from the network, having the charger assume a role of master of the network; or
if a response is received from the network, having the charger acknowledge an existing master and assume a role of slave within the network.

15. The method according to claim 14, wherein providing one or more chargers comprises providing a plurality of chargers, and, if more than one charger powers up at a same time and there is no existing master, causing the network to arbitrate the role of master.

16. The method according to claim 15, wherein causing the network to arbitrate the role of master comprises causing a charger having the highest serial number to assume the role of master of the network.

17. The method according to claim 14, wherein the one or more chargers communicate with one another via a CAN bus, further comprising the step of providing the CAN bus with at least two channels, of which one is for communications within the network of the one or more chargers, and wherein another one is for communications within another network or system.

18. The method according to claim 14, further comprising the step of causing the charger to provide a charger number to each charger in the network after assuming the role of master of the network, if the charger assumes the role of master, thereby reducing message size and virtualizing the network to an outer environment.

19. The method according to claim 14, wherein providing one or more chargers comprises providing a plurality of chargers, and wherein forming a network comprises forming a network is configured to have the master power up the network using any desired number of chargers, thereby increasing efficiency by using a lower number of chargers and disabling some of the chargers, or increasing speed of charge by using a higher number of chargers.

20. The method according to claim 14, wherein each charger includes an enabled state and disabled state overhead, further comprising the step of having a disabled charger operate only with the disabled state overhead in order to decrease power consumption and increase efficiency.

* * * * *